(12) United States Patent
Drew et al.

(10) Patent No.: US 11,866,111 B2
(45) Date of Patent: Jan. 9, 2024

(54) BICYCLE ELETRONIC DEVICE HOLDER

(71) Applicant: Delta Cycle Corporation, Randolph, MA (US)

(72) Inventors: Errol Drew, Los Gatos, CA (US); Joseph Molinari, San Rafael, CA (US)

(73) Assignee: Delta Cycle Corporation, Randolph, MA (US)

( * ) Notice: Subject to any disclaimer, the term of this patent is extended or adjusted under 35 U.S.C. 154(b) by 557 days.

(21) Appl. No.: 17/158,300

(22) Filed: Jan. 26, 2021

(65) Prior Publication Data

US 2021/0229769 A1    Jul. 29, 2021

Related U.S. Application Data

(60) Provisional application No. 62/967,229, filed on Jan. 29, 2020.

(51) Int. Cl.
   *B62J 11/00*   (2020.01)
   *B62J 45/00*   (2020.01)

(52) U.S. Cl.
   CPC ............. *B62J 11/00* (2013.01); *B62J 45/00* (2020.02)

(58) Field of Classification Search
   USPC ................................ 224/445, 448, 420, 421
   See application file for complete search history.

(56) References Cited

U.S. PATENT DOCUMENTS

| | | | | |
|---|---|---|---|---|
| 6,328,268 | B1* | 12/2001 | Irie | B62J 50/22 248/230.1 |
| 9,402,016 | B1* | 7/2016 | Hidalgo | H04N 23/51 |
| 9,879,705 | B2 | 1/2018 | Downes et al. | |
| 11,299,227 | B1* | 4/2022 | Fang | B62J 9/20 |
| 2011/0266321 | A1* | 11/2011 | Hsueh | B62J 11/00 224/448 |
| 2015/0191126 | A1* | 7/2015 | Wadey | B60R 11/04 224/567 |
| 2016/0001839 | A1* | 1/2016 | Van Balveren | B62J 9/21 224/420 |
| 2017/0120980 | A1 | 5/2017 | Karl | |
| 2021/0323625 | A1* | 10/2021 | Hulme | B62J 45/20 |
| 2021/0371034 | A1* | 12/2021 | Wattrus | B62J 11/00 |

FOREIGN PATENT DOCUMENTS

| EP | 2962922 | * | 1/2016 |
| TW | M460039 | * | 8/2013 |

* cited by examiner

*Primary Examiner* — Anne Marie M Boehler
(74) *Attorney, Agent, or Firm* — Iandiorio Teska & Coleman, LLP

(57) ABSTRACT

A electronic device holder including a mount for securing an electronic device thereto, a collar for mounting about a bar, and a shaft between the collar and the mount. A support brace preferably associated with the collar and is configured for engagement with the underside of a bar stem to prevent rotation of the collar about the bar.

7 Claims, 8 Drawing Sheets

BICYCLE ELETRONIC DEVICE HOLDER

RELATED APPLICATIONS

This application claims benefit of and priority to U.S. Provisional Application Ser. No. 62/967,229 filed Jan. 29, 2020, under 35 U.S.C. §§ 119, 120, 363, 365, and 37 C.F.R. § 1.55 and § 1.78, which is incorporated herein by this reference.

FIELD OF THE INVENTION

This subject invention relates to bicycle electronic device holders also called caddies.

BACKGROUND OF THE INVENTION

Electronic (e.g., cell phones or personal data assistant) holders or caddies attached to a bicycle handlebar are known. See U.S. Pat. No. 9,879,705 and published U.S. 1$ application No. 2017/0120980 both incorporated herein by this reference. There is usually some kind of a mount for the electronic device and collar coupled about the bicycle handlebar. The preferred holder is lightweight, adaptable for a wide variety of bicycles and electronic devices, and easy to install.

BRIEF SUMMARY OF THE INVENTION

The inventors hereof discovered that in some instances, in use, the collar can rotate relative to the handlebar. The result can be a repositioning of the electronic device out of view of the rider and/or even damage to the electronic device.

Featured in one preferred embodiment is a new bicycle electronic device holder including a brace which extends inwardly from the collar and engaging the underside of the handlebar stem to prevent rotation of the collar about the handlebar. The preferred holder is lightweight, adaptable for a wide variety of bicycles and electronic devices, and easy to install.

This invention features an electronic device holder comprising a mount for securing an electronic device thereto, a collar for mounting about a bar, and a shaft between the collar and the mount. A support brace is preferably associated with the collar and is configured for engagement with the underside of a bar stem to prevent rotation of the collar about the bar.

One version of the mount includes two or more elastic members for securing the electronic device to the mount. The collar may include a hinged section for securing the collar to the bar. The support brace preferably includes a ring which resides within the collar and a support member coupled to the ring. The collar and the ring preferably define a longitudinal axis and the support member preferably extends perpendicular to the longitudinal axis and then curves to extend parallel to the longitudinal axis. The support member may be attached to one edge of the ring and there may be a gap between the support brace and an outer surface of the ring member for receiving the collar therein.

Also featured is a bicycle electronic device holder comprising a mount for securing an electronic device thereto, a collar for mounting about a bicycle handlebar, and a ring configured to reside within the collar about the bicycle handlebar. A support member is coupled to the ring and extends inwardly from the collar for engagement with the underside of the handlebar stem to prevent rotation of the collar about the handlebar.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
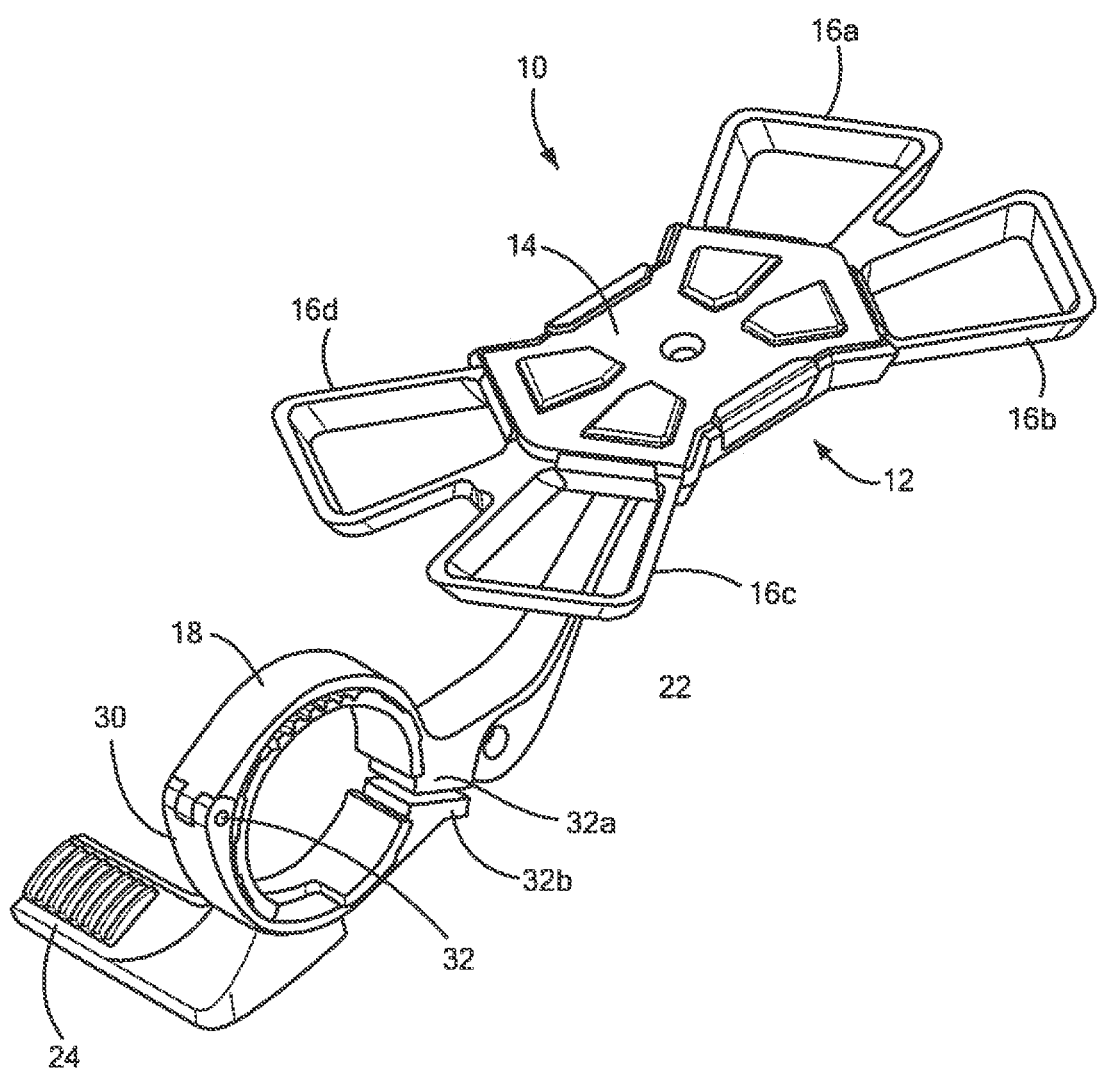
FIG. 1 is a schematic three dimensional view of one embodiment of an electronic device holder.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

In one embodiment, bicycle electronic device holder or caddy 10 includes mount 12 for securing an electronic device thereto. In this specific embodiment, mount 12 includes base plate 14 and four corner elastic (e.g., silicone) members 16a-16b to be secured around the four corners of the electronic device (e, g., mobile phone) securing it to base plate 14. In other embodiments, there are other means for holding the electronic device.

Figure 2:
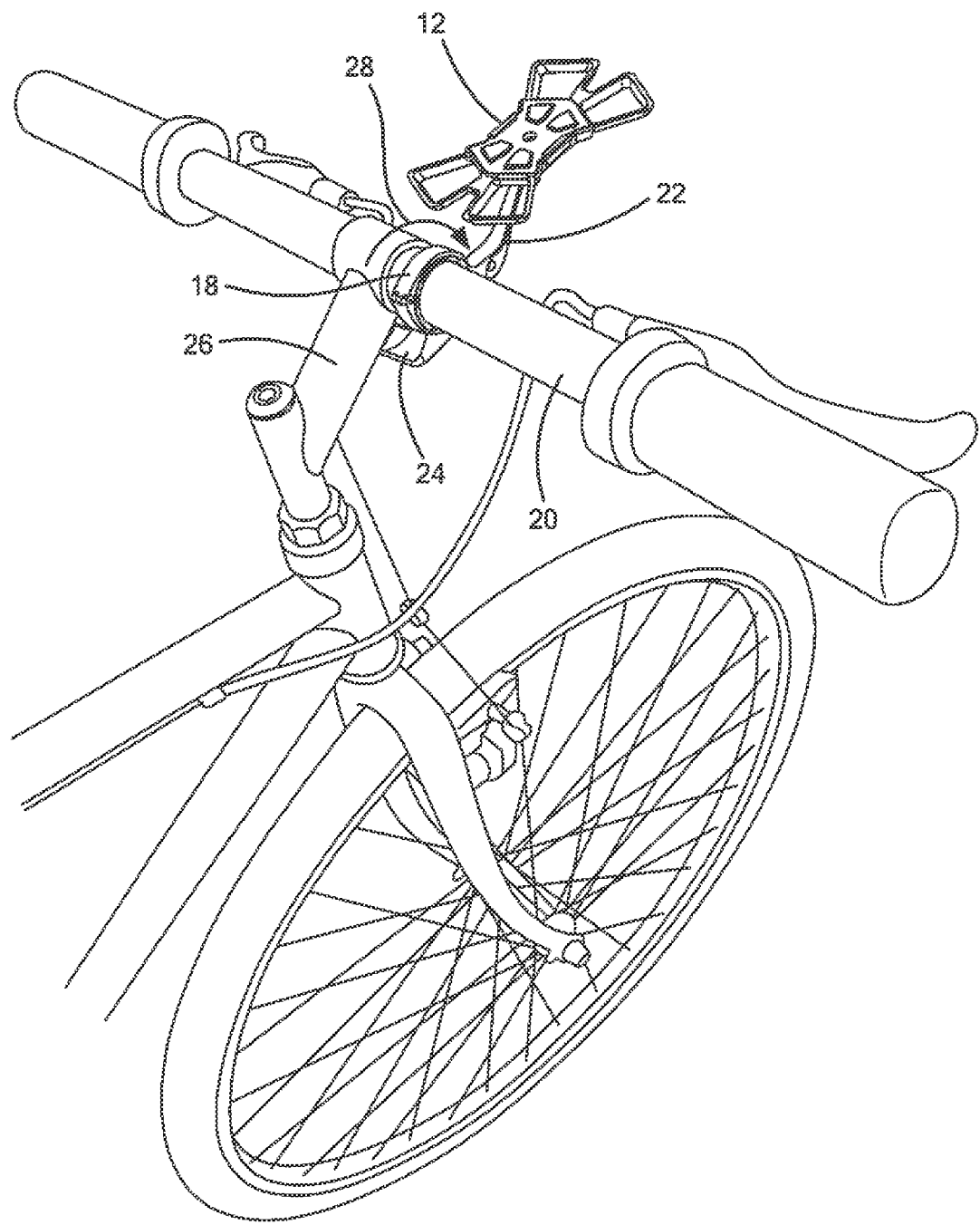
FIG. 2 is a schematic three dimensional view showing the holder of FIG. 1 in place on a bicycle handlebar.
Figure 3:
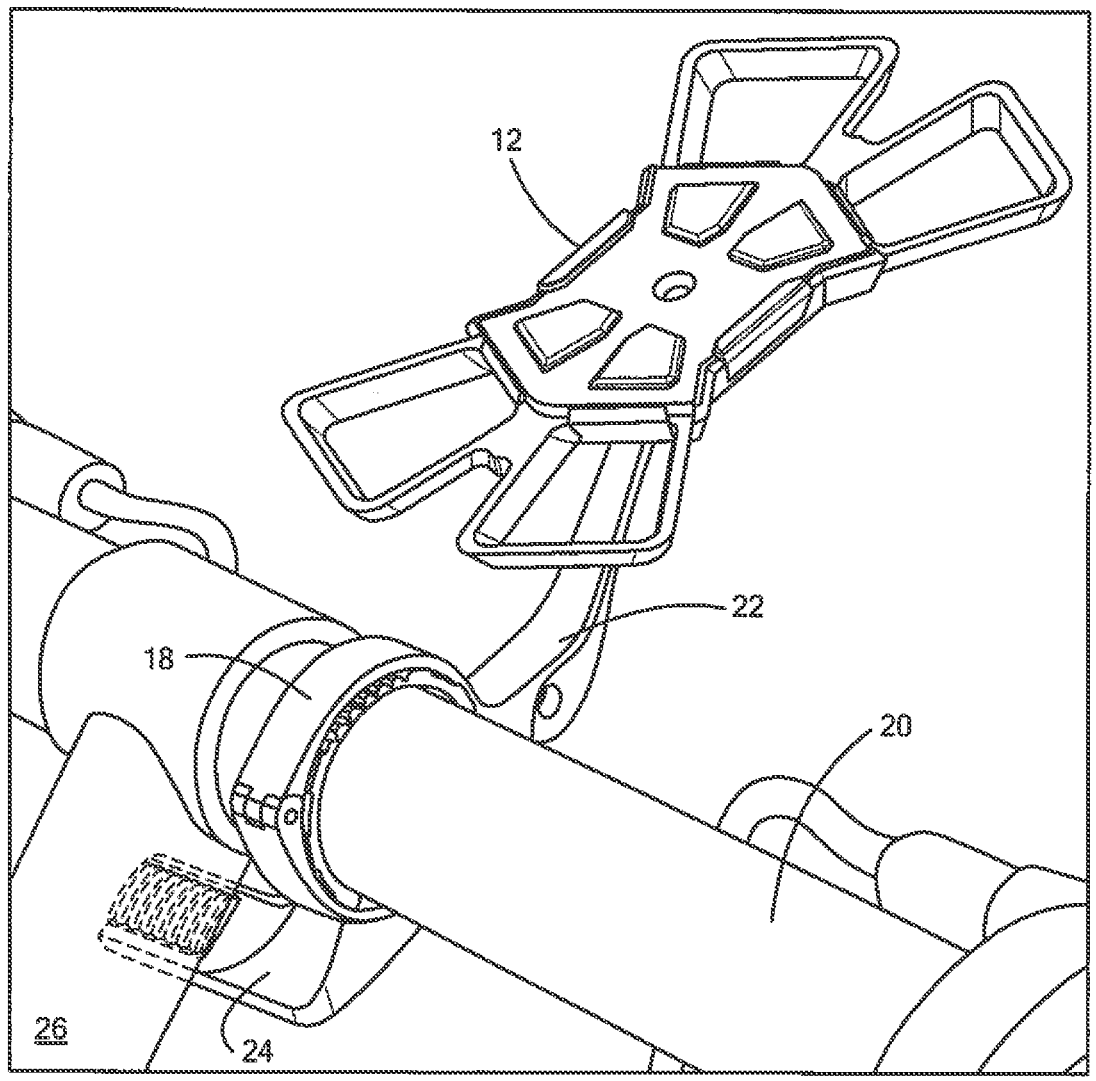
FIG. 3 is a close up view of the electronic device holder mounted to a bicycle handlebar.
Figure 4:
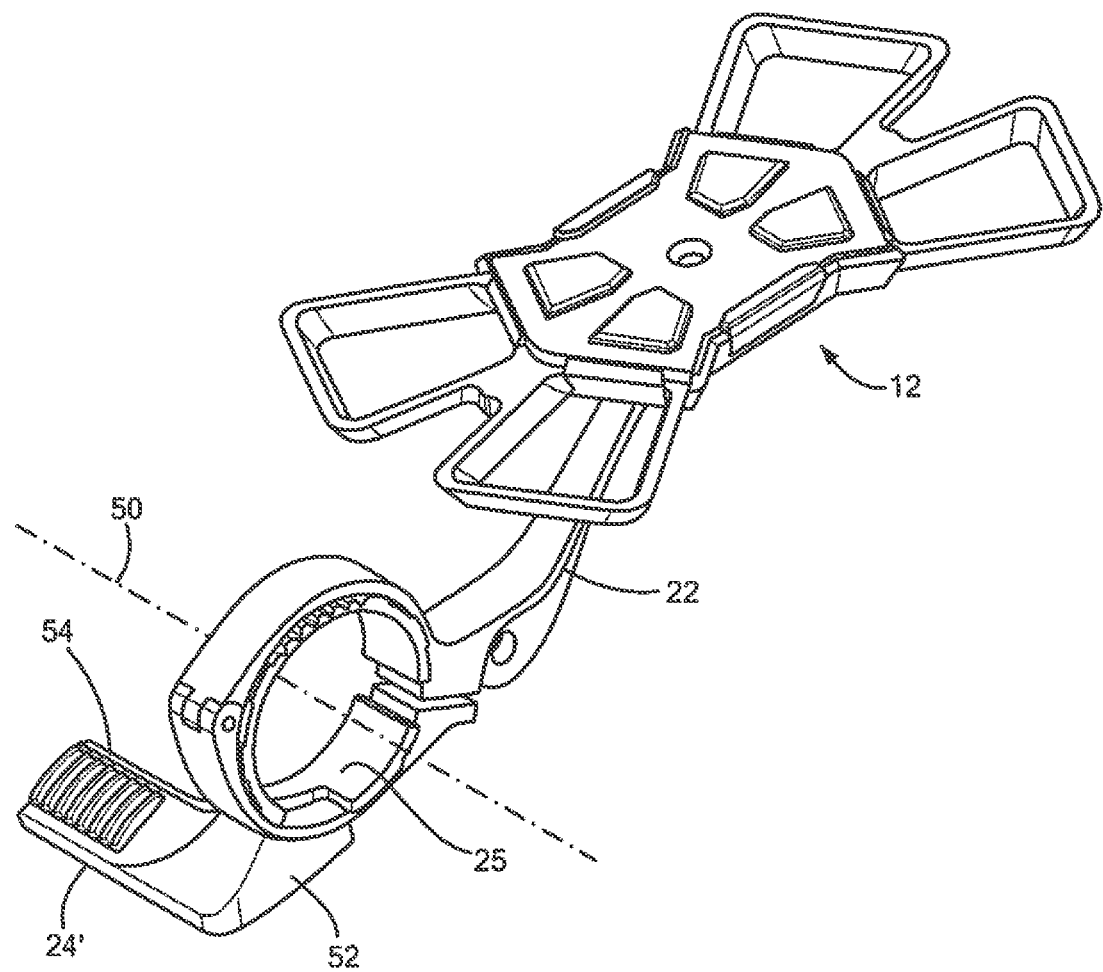
FIGS. 4-7 are schematic three dimensional views showing another embodiment of an electronic device holder.
Figure 5:
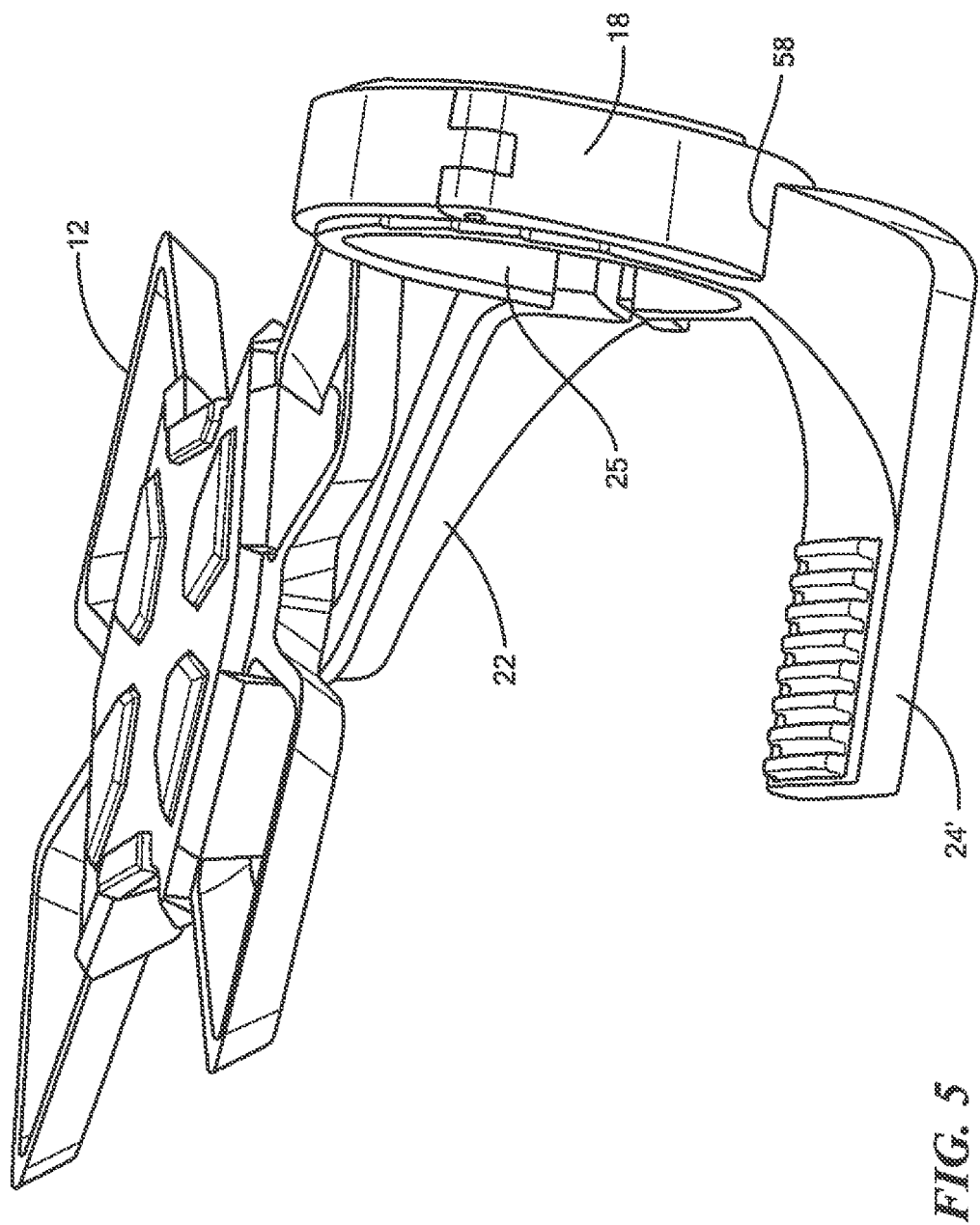
Figure 6:
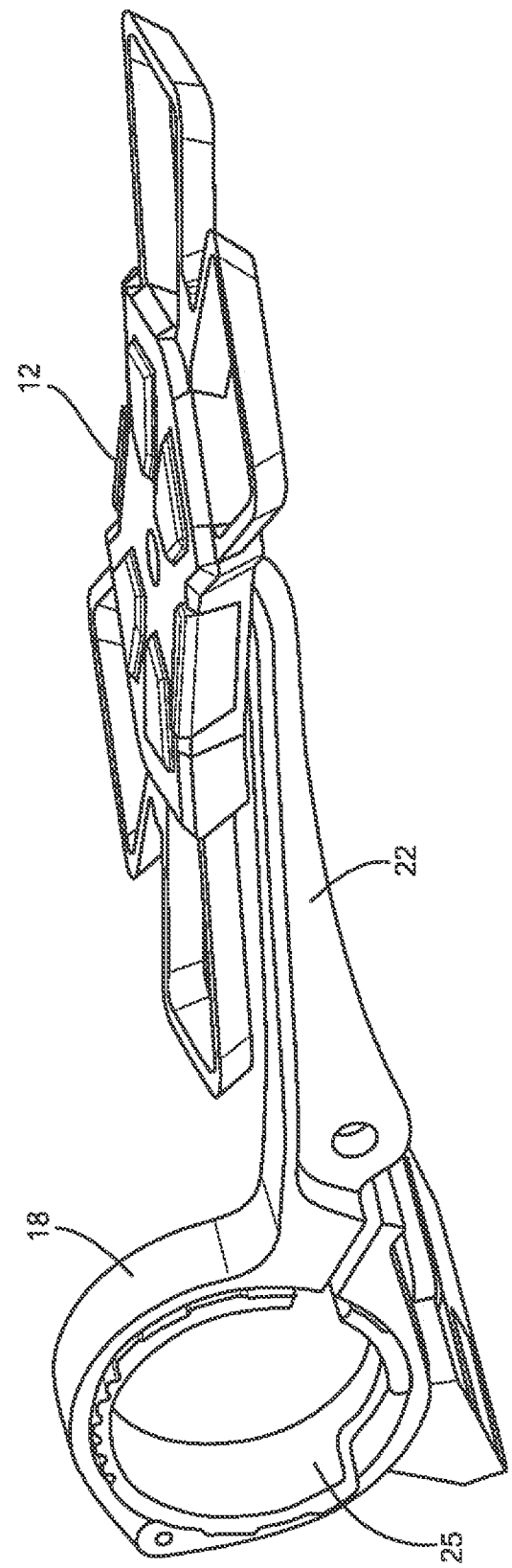
Figure 7:
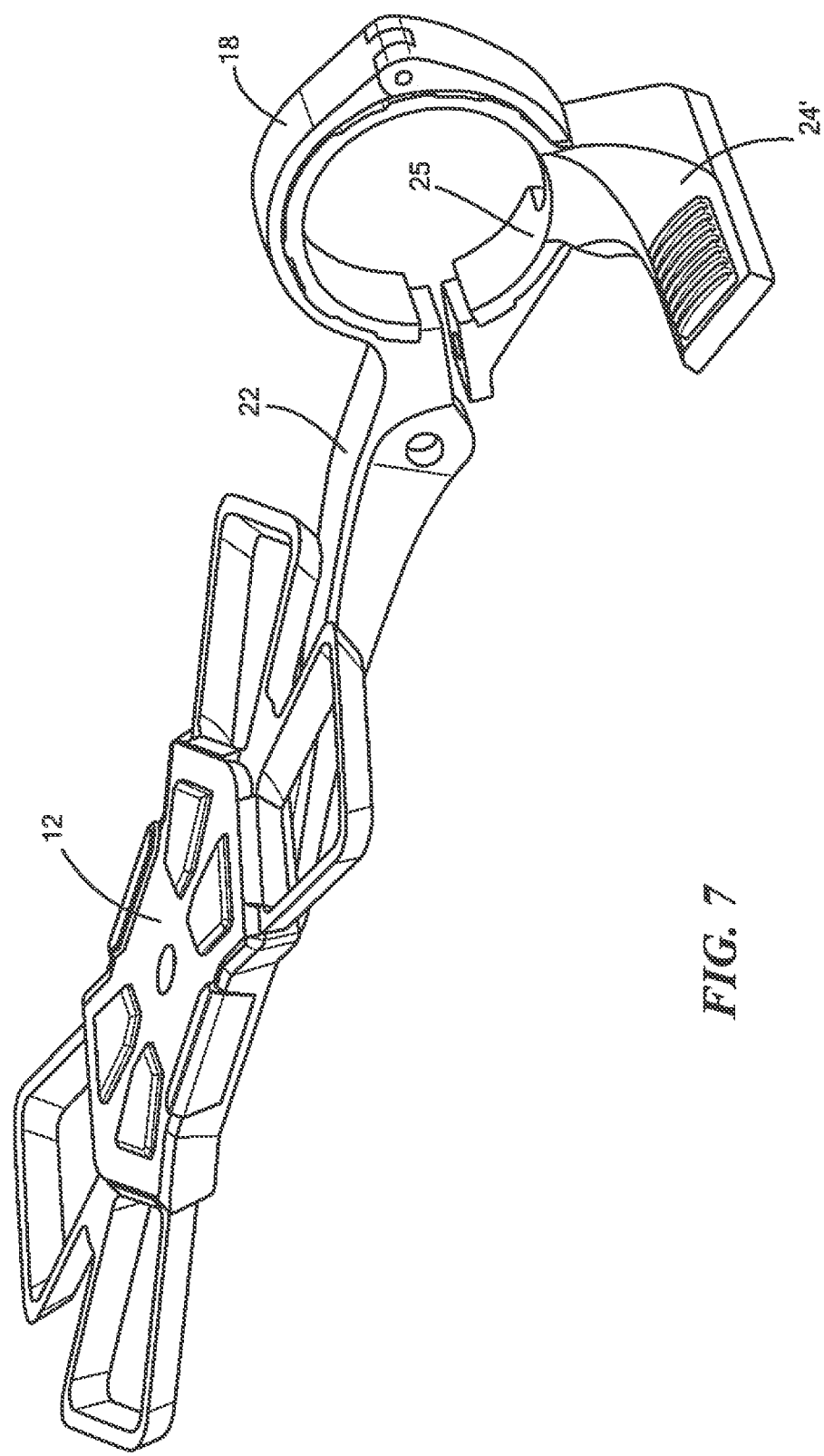
Figure 8:
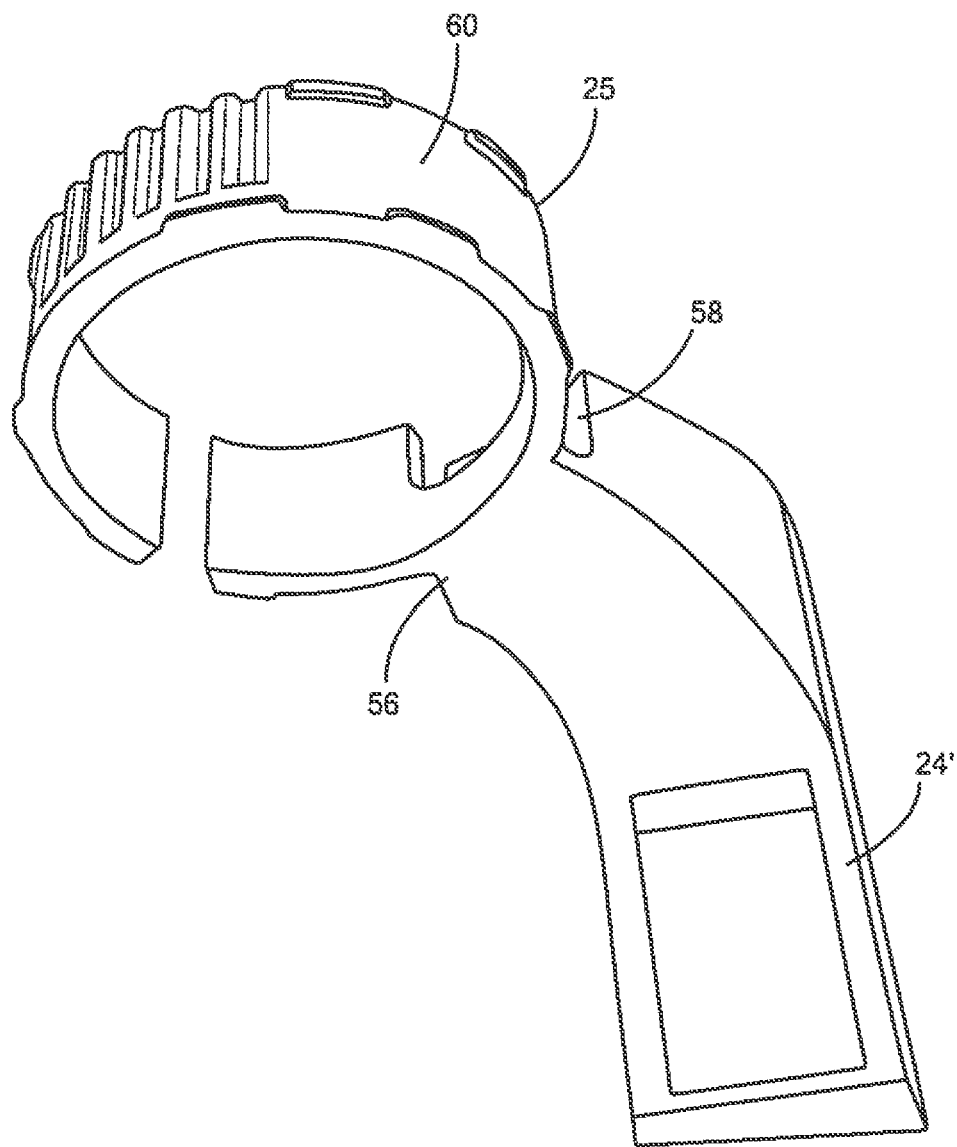
FIG. 8 is a schematic three dimensional view showing a shim member and a support brace extending inwardly therefrom for the embodiments of FIGS. 4-7.

Holder 10 also includes circular collar 18 for mounting about a bicycle handlebar 20, FIGS. 2-3. There may be a shaft 22 between collar 18 and mount 12. Handlebar stem support brace 24 extends inwardly from collar 18 for engagement with the underside of handlebar stem 26 to prevent rotation of the collar about the handlebar 20 in the direction shown by arrow 28.

In one preferred embodiment, collar 18 includes hinged section 30 and hinge 32 enabling the collar section to be open and closed for securing about the bicycle handlebar. A fastener such as a screw or bolt may be used to secure flange 32a to flange 32b. Other means are possible for retaining collar 18 in its closed position.

In one preferred embodiment, brace 24, FIGS. 4-8 includes split ring 25 fitted into collar 30. Depending on the size of the handlebar, an additional shim may be fit within or around split ring 25, Support member 24' extends from ring 25 configured to reside in collar 18. Thus, when split ring 25 is placed inside collar 18, support member 24 extends inwardly from collar 18. Collar 18 and ring 25 define longitudinal axis 50 and support member 24' extends perpendicular to longitudinal axis 50 at portion 52 and then curves to extend parallel to the longitudinal axis 50 at portion 54. Support member 24' is attached to one edge of ring 25, FIG. 8 and there is a gap 58 between the member 24' and the outer surface 60 of the ring 25 receiving a portion of collar 18 therein, FIG. 7.

The result is an electronic device holder which does not rotate on the handlebar ensuring the mobile device is within the line of sight of the rider during even rough trail rides and also preventing damage to the electronic device held by the caddy. Preferred is a lightweight construction (e.g., aluminum).

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. A electronic device holder comprising:
   a mount for securing an electronic device thereto;
   a collar for mounting about a bar;
   a shaft between the collar and the mount; and
   a support brace associated with the collar and configured for engagement with the underside of a bar stem to prevent rotation of the collar about the bar, the support brace including a ring residing in the collar, a support member coupled to an edge of the ring, the collar and the ring defining a longitudinal axis and the support member extending perpendicular to the longitudinal axis and then curving to extend parallel to the longitudinal axis and a gap between the support member and an outer surface of the ring for receiving the collar therein.

2. The holder of claim 1 in which the mount includes two or more elastic members for securing the electronic device to the mount.

3. The holder of claim 1 in which the collar includes a hinged section for securing the collar to the bar.

4. A bicycle electronic device holder comprising:
   a mount for securing an electronic device thereto;
   a collar for mounting about a bicycle handlebar;
   a ring configured to reside within the collar about the bicycle handlebar; and
   a support member coupled to the ring and extending inwardly from the collar for engagement with the underside of a handlebar stem to prevent rotation of the collar about the handlebar, the collar and the ring defining a longitudinal axis and the support member extending perpendicular to the longitudinal axis and then curving to extend parallel to the longitudinal axis, the support member attached to one edge of the ring with a gap between the support member and an outer surface of the ring for receiving the collar therein.

5. The holder of claim 4 in which the mount includes two or more elastic members for securing the electronic device to the mount.

6. The holder of claim 4 in which the collar includes a hinged section for securing the collar to the bicycle handlebar.

7. The holder of claim 4 further including a shaft extending between the collar and the mount.

* * * * *